United States Patent [19]

Johnson et al.

[11] 4,422,144
[45] Dec. 20, 1983

[54] MICROINSTRUCTION SUBSTITUTION MECHANISM IN A CONTROL STORE

[75] Inventors: Lance H. Johnson, Endicott; John A. Kiselak, II, Poughkeepsie; Edward A. Nadarzynski, Hopewell Junction; Raymond J. Pedersen, Garrison, all of N.Y.

[73] Assignee: International Business Machines Corp., Armonk, N.Y.

[21] Appl. No.: 269,288

[22] Filed: Jun. 1, 1981

[51] Int. Cl.³ .................... G06F 9/26; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,800,293 | 3/1974 | Enger et al. | 364/200 |
| 3,958,227 | 5/1976 | Evans | 364/200 |
| 3,976,865 | 8/1976 | Enger | 371/67 |
| 4,231,089 | 10/1980 | Lewine et al. | 364/200 |

Primary Examiner—Harvey E. Springborn
Attorney, Agent, or Firm—Robert W. Berray

[57] ABSTRACT

A microinstruction control storage mechanism includes a read-only store (ROS), writeable control store (WCS), first cycle control store, and a reserved portion of main storage in a data processing system. The ROS stores frequently used sequences of microinstructions and is not altered during operation. Other sequences of microinstructions which are not frequently used are stored in the reserved portion of main storage. As required, blocks of microinstructions are paged into the WCS from the main storage. One cycle of execution is saved for each machine instruction by utilizing the operation code portion directly from the instruction register of the data processing system to access a microinstruction from the first cycle control store. An array of single-bit storage devices, accessed by microinstruction addresses also utilized to access microinstructions from the ROS, signal the existence of a faulty microinstruction from the ROS as determined by maintenance or design personnel. In response to a halt signal from an accessed single-bit storage device, an address substitution mechanism creates a microinstruction address which identifies a main storage location and may have to be used to initiate transfer of a block of microinstructions from main storage to the WCS to provide access to a particular substitute microinstruction for the faulty microinstruction.

4 Claims, 11 Drawing Figures

MICROINSTRUCTION SUBSTITUTION MECHANISM IN A CONTROL STORE

BACKGROUND OF THE INVENTION

1. Field of the Invention

The present invention relates to a microprogram control store element (CSE) in a data processing system, and more particularly to a CSE comprised of a read-only store (ROS) and a writeable control store (WCS), dynamically changed during data processing by transfer of microcode from main storage to the WCS, and wherein the WCS is utilized to provide a substitute microinstruction for a known erroneous microinstruction accessed from the ROS.

2. Related Patent Applications

The following applications, including this application assigned to the assignee of this application, have been filed on even date herewith:

1. Ser. No. 269,246 entitled "A Binary Number Substitution Mechanism In Microinstruction Addressing Apparatus" invented by R. J. Pedersen.

2. Ser. No. 269,147 entitled "An Improved Binary Number Substitution Mechanism" invented by F. T. Blount; and 3. Ser. No. 269,148 entitled "Microcode Control of Microinstruction Substitution In A Control Store Mechanism" invented by E. A. Nadarzynski et al.

PATENTS INCORPORATED BY REFERENCE

The following U.S. patents, all assigned to the assignee of the present invention, disclose various elements of a control store mechanism utilizing the present invention, and are herewith incorporated by reference:

1. U.S. Pat. No. 3,800,293 issued Mar. 26, 1974, entitled "Microprogram Control Sub-System" by T. A. Enger et al.

2. U.S. Pat. No. 3,958,227 issued May 18, 1976, entitled "Control Store System With Flexible Control Word Selection" by C. W. Evans.

3. U.S. Pat. No. 3,976,865 issued Aug. 24, 1976, entitled "Error Detector For An Associative Directory Or Translator" by T. A. Enger.

4. U.S. Pat. No. 4,008,460 issued Feb. 15, 1977, entitled "Circuit For Implementing A Modified LRU Replacement Algorithm For A Cache" by L. R. Bryant et al.

Prior Art

In stored program data processing systems, two techniques for control of the data processing system are normally implemented. One involves the design of hardwired sequencers, and the other involves the design of a control store element (CSE) comprised of storage devices for storing sequences of micro-instructions making up microprograms. In either case, machine instructions transferred from main storage to the central processing unit will be interpreted to determine the coding of an operation code portion of the instruction to determine the function to be performed such as Add, Subtract, Multiply, etc. When a CSE is utilized, the operation code will normally be utilized to address a storage device to access the first microinstruction of a microprogram effective to execute the function called for by the operation code.

An excellent discussion of the various forms that a CSE can take is found in an article entitled "Microprogramming: Perspective and Status" by A. J. Agrawala and T. G. Rauscher, IEEE Transactions On Computers, Volume C-23, No. 8, August 1974, Page 817. One form of CSE includes at least two types of storage devices utilized for storing sequences of microinstructions making up microprograms. One type of storage device is a read-only store (ROS), and the other is a writeable control store (WCS). The ROS will be comprised of binary bit patterns which make up addressable microinstructions and which, during operation of the data processing system, will never be altered. In some data processing systems, the ROS may in fact be a permanently configured storage device created during manufacture of the data processing system. Another form of ROS would be a volatile storage device in which information can be stored, as necessary, but once initialized or loaded with microinstructions, will thereafter not be modified during processing functions. On the other hand, a WCS will be an addressable storage device of the read-write type wherein microinstructions can be dynamically stored into the storage device and thereafter read or accessed for use, and would be dynamically changed as conditions required during data processing. Examples of this type of CSE configuration are represented by U. S. Pat. Nos. 3,478,322 and 3,735,363.

Contempory data processing systems which include a CSE, also include a central processing unit and a main storage device for the storage of data and programs to be executed by the system. Also included is a processor controller, or console, which provides basic control for the entire system. It is the function of the processor controller, when power is turned on to the data processing system, to load necessary information into the data processing system.

The main storage device has a portion reserved for a number of system control data blocks, including all of the microprograms required to operate the system. This reserved portion of main storage is not addressable by program instructions executed by the system, but is primarily addressable by the central processing unit under control of microinstructions. To initialize the data processor, the processor controller will transfer all of the microcode, and other control information required by the system, to the reserved portion of main storage. By utilizing special data paths, the processor controller has the ability to store prespecified information into various registers, triggers, or storage arrays within the central processing unit, including the ROS of the CSE, if the ROS is a read-write type of storage device. If the ROS is a permanent storage device this would not be required. When a WCS is provided, this may be initialized by the processor controller or, as a minimum, the processor controller will store all of the microcode that may be utilized in the WCS into the main storage device.

The use of ROS in a CSE is normally for frequently used microcode. Its construction is such that it is very dense and high speed, but is relatively expensive when compared with a WCS. As the design of a data processing system progresses, a point will be reached where all of the microprograms have been written for the frequent processing functions required. A ROS storage device will be manufactured with the permanent bit patterns required to provide the necessary sequence of microinstructions. It is frequently discovered during the data processing system design, or after design has been completed, that certain of the previously created microinstructions in the ROS are erroneous. Another error situation that can occur with the ROS, even after the entire data processing system has been designed and erroneous microinstructions corrected, is that the hardware mechanism of the ROS may develop a failure which is permanent. Also, the creation of microcode that is permanently stored in a ROS is initially dictated by known features, functions and instructions to be executed when the data processing system is designed. New features, changing functions, or newly defined program instructions requiring modifications to the bit patterns of a ROS would require a long and expensive procedure, and systems already in use could not be modified easily.

SUMMARY OF THE INVENTION

A primary object of the present invention is to provide corrective action in a CSE which is unknown to a user or the remainder of the data processing system, except for a time lapse.

It is also an object of the present invention to provide corrective action in a CSE for a faulty microinstruction read from a ROS utilizing apparatus normally used for transfer of microcode, as needed, from the main store of a data processing system to a WCS.

A further object of the present invention is to substitute a main storage address for the address of a faulty microinstruction in a ROS, which main store address is one of a group of addresses set aside in main storage for substitute microinstructions, and which group of addresses is substantially less than the number of microinstructions stored in a ROS that could possibly be faulty.

These and other objects, features, and advantages, are realized in a data processing system that includes a main storage device, central processing unit, processor controller, and control storage element (CSE). The CSE includes, for the storage of microinstructions, a read-only store (ROS) and a writeable control store (WCS). The ROS contains a predetermined number of addressable microinstructions. The WCS functions essentially like a high-speed buffer, or cache, found between the main store and the CPU of many data processing systems. That is, the WCS contains a small number of microinstructions of all of the microinstructions which can be stored in the area reserved in the main store for microcode. The WCS is a fully associative storage device which includes an address directory for identifying and locating microinstructions in the WCS by using the main store address utilized for accessing the main store for the transfer of a group of microinstructions to the WCS. Since the WCS has a limited capacity, a least recently used (LRU) replacement algorithm is implemented. As new microinstructions are transferred from main store to the WCS, the replacement algorithm identifies the portion of the WCS to be replaced by the new group of microinstructions. The WCS functions in accordance with the teachings of the above-identified references 3 and 4. The dynamic, as-needed, transfer of groups of microinstructions from main storage to the WCS is similar to data transfer between I/O devices and main storage, and is called "paging". Therefore, the use of the WCS in this fashion prompts a re-naming to pageable control store (PCS).

The subject invention utilizes the previously defined mechanism to provide corrective action for errors in the CSE. The invention includes a storage device known as a halt array and an address substitution mechanism comprised of two storage arrays. The halt array includes a single bit position associated with each microinstruction that can be addressed in the ROS. As errors are noted in the operation of particular microinstructions read from ROS, maintenance personnel will provide necessary information in the processor controller to cause the associated bit position of the halt array to be changed to a binary 1. The halt array is accessed with the same microinstruction address utilized to access the ROS. When the corresponding bit position is read out and detected as a binary 1, the execution of the faulty microinstruction is prevented.

In response to the halt signal from the halt array, the address of the faulty microinstruction in ROS is utilized in an address substitution mechanism which provides an address translation function to address the location in main storage of the microinstruction to be substituted for the faulty microinstruction.

When the address substitution mechanism has provided the main store address, the previously defined PCS address directory and transfer mechanism is utilized to cause the substitute microinstruction to be accessed from PCS to provide correct operation for that microinstruction cycle. If the directory indicates a match, PCS already contains the substitute microinstruction and will be immediately accessed. A miss in the directory will initiate a transfer from main storage. Normal processing will resume after the substitute microinstruction has been executed.

Maintenance personnel using the processor controller mechanism specify substitute main store addresses which provides the ability to compress the amount of main storage addresses required to identify a particular substitute microinstruction for only the faulty microinstructions addressed from ROS. When the system is initialized, the processor controller data path to the CSE will be utilized to load the current information into the halt array and address substitution mechanism, which provides the translated addresses for accessing main store. One embodiment of the address substitution mechanism does not require concern of maintenance personnel for creating substitute addresses as each error is noted. Rather, addresses can be pre-specified and permanently designed into the address substitution mechanism.

The invention is defined with particularity in the appended claims. The above and further objects and advantages of this invention may be better understood by referring to the following detailed description taken in conjunction with the accompanying drawings.

DETAILED DESCRIPTION OF INVENTION

Figure 1:
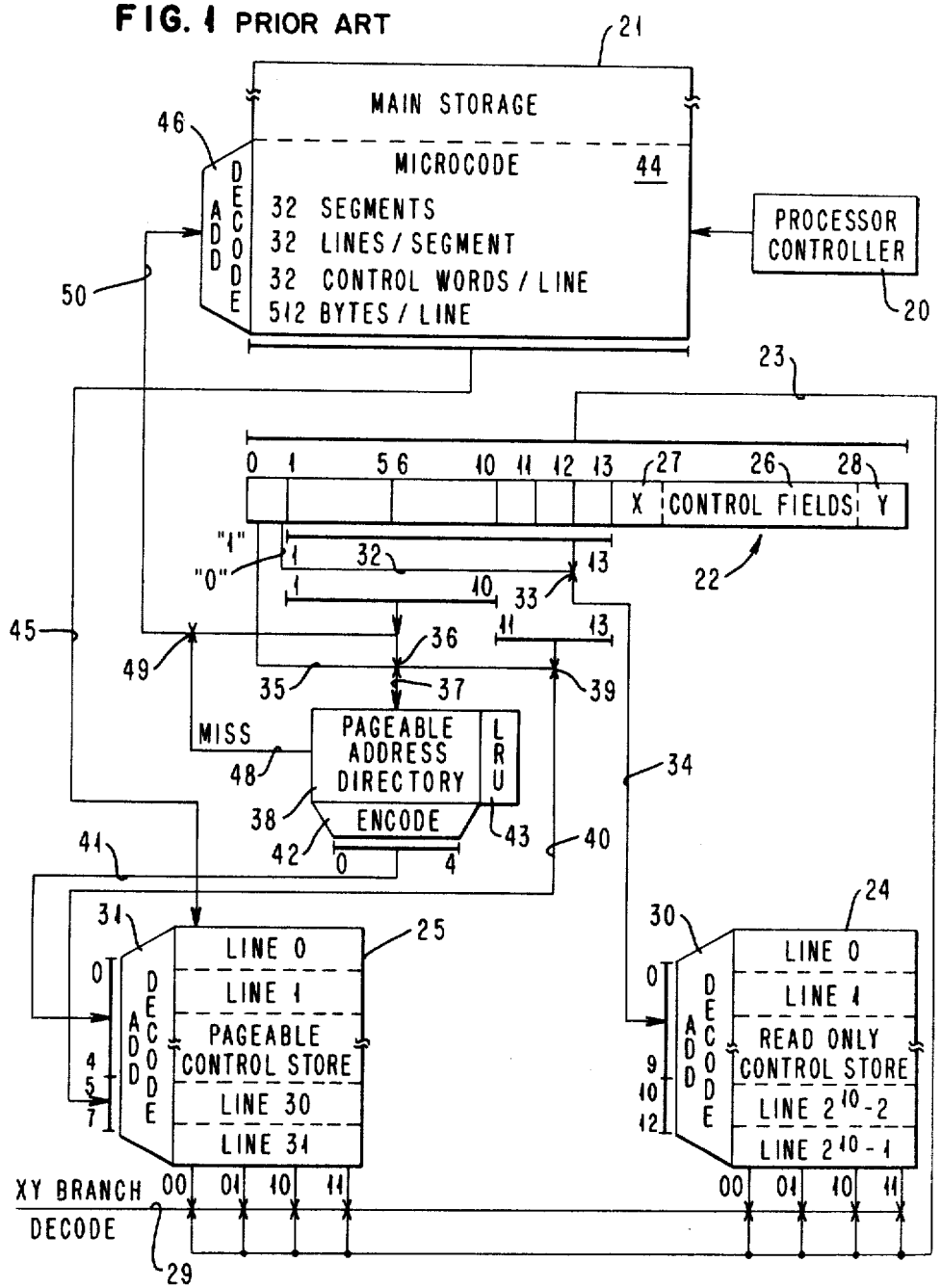
FIG. 1 is a block diagram showing the major components of a control store element (CSE).

FIG. 1 is a block diagram showing the relationship of a Processor Controller 20, Main Storage 21, and a Control Store Element (CSE) of a contemporary data processing system. Only that portion of a CSE required to understand the present invention is shown. The CSE includes a Control Store Data Register (CSDR) 22 which stores, for each cycle, a microinstruction received on line 23 from either a Read-Only control Store (ROS) 24 or a Pageable Control Store (PCS) 25.

Each microinstruction stored in CSDR 22 includes a number of control fields 26, the decoding of which control the data flow, logic, and arithmetic of a data processing system. In many contemporary data processing systems utilizing a CSE, each microinstruction also includes the information necessary to address the next microinstruction in sequence. The address of the next microinstruction, often referred to in the literature as the next address (NA), includes CSDR 22 bit positions 0 through 13. To provide branching capability in a microinstruction sequence, each microinstruction also includes an X-branch control field 27 and a Y-branch control field 28. The branch control fields 27 and 28 are coded to select a particular data processing machine condition to provide coded information for accomplishing a microprogram branch. The use of the branching capability will be discussed subsequently. An understanding of this capability is completely defined in the above cited Reference 2. The results of the branching capability are effective on a line 29 in FIG. 1 to select one of four possible microinstructions addressed and accessed from either the ROS 24 or PCS 25 to transfer the selected microinstruction on line 23 to the CSDR 22.

A microprogrammer who is creating the sequence of microinstructions for the data processing system will have the ability to code each microinstruction in the CSDR 22 to cause address and accessing of microinstructions from either the ROS 24 or PCS 25. This selection is made by the state of NA bit position 0. A binary "0" will cause the remainder of the NA bit positions to be effective at Address Decode 30 to effect access and readout of ROS 24. A binary "1" in NA bit position 0 will cause Address Decode 31 associated with PCS 25 to be effective.

When NA bit position 0 is a binary "0", as signalled on line 32, the gate 33 will be effective to transfer NA bits 1 through 13 on lines 34 to the address decode 30 of ROS 24. When NA bit 0 is a binary "1", as signalled on line 35, a gate 36 will be enabled to transfer NA bits 1 through 10 on a line 37 to a Pageable Address Directory 38, the function of which will be subsequently described. The signal on line 35 will also enable a gate 39 to transfer NA bits 11 through 13 on line 40 to be part of the address utilized in Address Decode 31 of PCS 25. The remainder of the address utilized in the address decode 31 of PCS 25 is transferred on line 41 from an Encode mechanism 42 associated with the Pageable Address Directory 38.

The proper operation of the Pageable Address Directory 38 requires a replacement algorithm which is provided by an LRU mechanism 43. The function of the Pageable Address Directory 38, Encode mechanism 42, and LRU mechanism 43 are thoroughly described in the above cited References 3 and 4.

As indicated earlier, an area 44 is reserved in Main Storage 21 for the microcode which is to be transferred to the PCS 25 as required. The reserved area 44 is loaded with microcode from the Processor Controller 20. Each time a quantity of microcode is to be transferred from Main Storage 21 to PCS 25 on line 45, Main Storage 21 will be addressed by an Address Decode mechanism 46 to cycle and transfer 512 consecutive 8-bit bytes on line 45 to PCS 25. The 512bytes are configured to provide 32 microinstructions. These 32 microinstructions are identified as a "line" of microcode.

In accordance with the manner in which the NA bits 1 through 13 are configured, NA bits 11, 12 and 13, along with the final 2 bits provided by the XY branching capability, identify a particular microinstruction within a line of 32 microinstructions. The remainder of the NA bits are configured to provide identification of segments and lines within segments. That is, NA bits 1 through 5 are capable of identifying 32 segments of microcode and NA bits 6 through 10 are capable of identifying 32 lines within a particular segment of microcode. This addressing capability of NA bits 1 through 13 and the XY branch bits provides an addressing capability of 32K (K=1,024) microinstructions that could be stored in the reserved area 44. A preferred embodiment for the present invention utilizes less than this capability. In particular, the ROS 24 has been designed to permanently store 8K microinstructions. Therefore, whereas the Address Decode mechanism 30 is shown to be receiving 13 NA bits, only NA bits 3 through 13, along with the XY branch selection, are required to provide access to one of the 8K microinstructions.

As shown in FIG. 1, the PCS 25 is configured to include 32 lines of microcode totaling 1K microinstructions. In accordance with the teaching of the above-cited References 3 and 4, each NA specifying a pageable main store address, indicated on line 35, will initiate an associative search in the Pageable Address Directory 38 to determine which line of PCS 25 contains the microcode line being addressed. If the line requested is stored in PCS 25, an associated one of the registers in the Pageable Address Directory 38, indicates the match and its identity will be encoded by Encode mechanism 42 to provide the five address bits required on line 41 to select the proper line in PCS 25. The remainder of the NA bits 11 through 13 will be transferred on line 40 to the Address Decode mechanism 31 to select a branch-group of four microinstructions from the line. The particular one of the microinstructions in the branch-group to be transferred on line 23 to CSDR 22 is selected by the XY Branch Decode 29.

If the line of pageable microcode identified by NA bits 1 through 10 do not find a match in the Pageable Address Directory 38, a signal on line 48 indicating a Miss will be effective at a gate 49 to transfer the NA bits 1 through 10 on line 50 to the Address Decode mechanism 46 to initiate transfer of the 512 bytes comprising the line of microcode required on line 45 to PCS 25. The LRU mechanism 43, in accordance with the teaching of Reference 4, will select the line of PCS 25 least-recently used to receive and store the line of microcode. The line of PCS 25 selected by the LRU mechanism 43 will cause the next address bits 1 through 10 to be stored in the associated register of the Pageable Address Directory 38.

Figure 2:
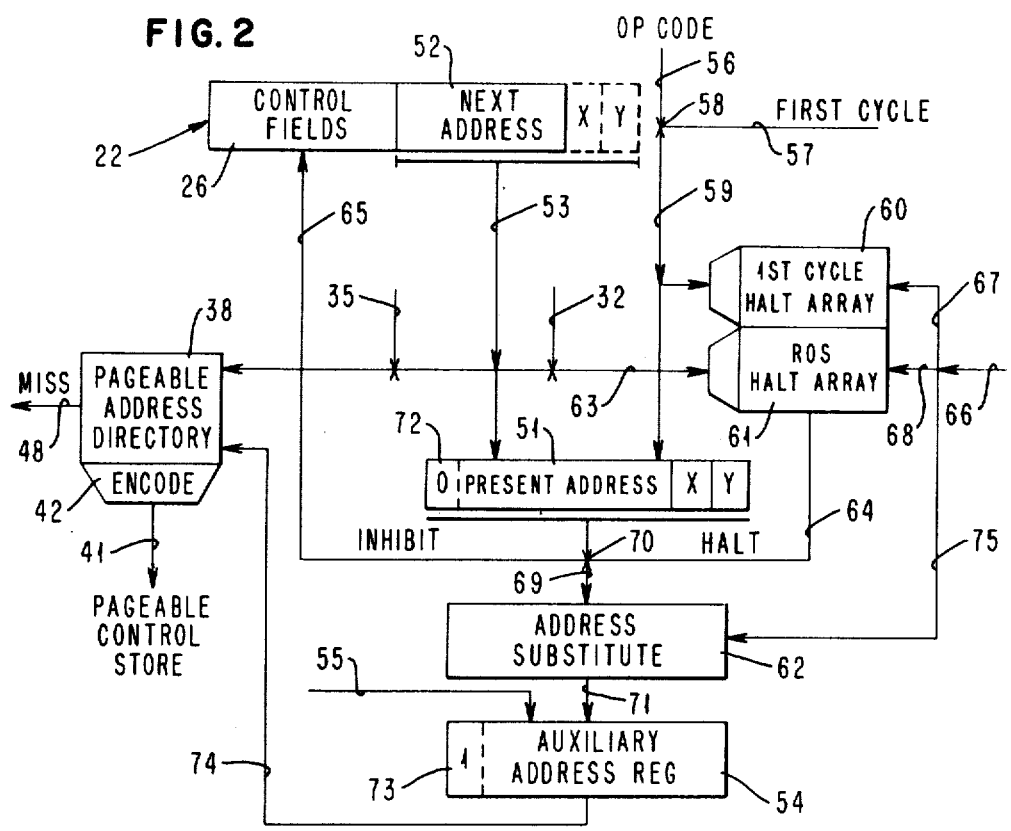
FIG. 2 is a block diagram showing the addition of the present invention, and its relationship, to certain portions of FIG. 1.

FIG. 2 is a block diagram that includes certain portions of the apparatus disclosed in FIG. 1. The same numeric designation has been utilized. Additional structure of a CSE in a contemporary data processing system is included in FIG. 2. A Present Address Register 51 stores the complete address, including the XY branch bits, utilized to access a microinstruction for transfer to the CSDR 22. When the Next Address portion 52 of each microinstruction is transferred to the address decoding mechanism 30 or 31 shown in FIG. 1, it is transferred on line 53 to the Present Address Register 51. The Present Address Register 51 therefore retains the address of each microinstruction transferred to, and stored in, CSDR 22 during the cycle that the control fields 26 are effective. Another register shown in FIG. 2 is an Auxiliary Address Register 54 which is utilized in the contemporary data processing system to receive, on a line 55, control store address information from a number of other sources during the sequencing of the CSE.

Also added to the description of FIG. 2 is an additional input to the CSE in accordance with the above cited Reference 1 which discloses the concept of a first cycle control store in the CSE. That is, on the first cycle of any machine instruction execution, the operation code of the machine instruction is utilized to access a control store element utilized only for the first cycle of machine instruction execution. FIG. 2 shows a line 56 which receives the OP CODE portion of the machine instruction. When a signal on a line 57 indicates a first cycle of machine instruction execution, the gate 58 will be enabled to transfer the OP CODE bits on line 59 to the Present Address Register 51. Therefore, the Present Address Register 51 will store a representation of the OP CODE on line 56 during the cycle that the microinstruction accessed on the first cycle is stored in the CSDR 22.

As indicated previously, there are a number of situations in which there is a desire to change the normal sequencing of previously written microcode stored in the ROS 24 of FIG. 1. These situations could include the detection of a permanent error in a microinstruction, a particular microinstruction may be proper but other hardware of the data processing system may cause an error condition which must be rectified, the microinstruction accessed from the first cycle control store may be faulty, or the data processing system may be required to respond to an OP CODE of a machine instruction which it was not originally designed to execute. In all of these situations, it is the primary object of the present invention to inhibit the normal functioning of a microinstruction transferred to CSDR 22 and substitute a microinstruction to be accessed from the PCS 25 of FIG. 1.

The apparatus of the subject invention to achieve the above cited result includes a First Cycle Halt Array 60, a ROS Halt Array 61, and an Address Substitute mechanism 62. Each of the arrays 60 and 61 has a single bit storage position for each microinstruction that can conceivably create an error condition. If the OP CODE received on line 56 has eight bit positions, as is standard, the First Cycle Halt Array 60 will have 256 bit storage positions. In accordance with the preferred embodiment of the present invention, the ROS 24 will store 8K microinstructions, and therefore the ROS Halt Array 61 will be comprised of 8K bit storage positions.

When either the First Cycle Halt Array 60 or the ROS Halt Array 61 is accessed, either by the OP CODE on line 59, or the Next Address portion 52 on line 63, gated by the signal line 32 indicating a ROS 24 address, a binary "1" in the accessed bit storage position will provide a Halt signal on line 64 indicating an error situation, and will be effective on a line 65 to inhibit the operation of the control fields 26 of the microinstruction accessed from either the first cycle control store or the ROS 24 of FIG. 1.

The Processor Controller 20 of FIG. 1 is utilized during the initialization of the data processing system to provide the proper pattern of binary "1" and binary "0" for the First Cycle Halt Array 60 or the ROS Halt Array 61. This information is created by maintenance personnel, and during the initialization process, will be input to the arrays on lines 66, 67 and 68. As the need for changes to microinstruction execution are noted, the proper bit patterns will be created by maintenance personnel for storage in the halt arrays at the address associated with the microinstruction to be inhibited.

When a halt is indicated on signal line 64, the address stored in the Present Address Register 51 of the microinstruction for which a substitute microinstruction is to be accessed, is transferred on a line 69 through a gate 70 to the Address Substitute mechanism 62. The Address Substitute mechanism 62 will then effect a translation of the address stored in the Present Address Register 51 to a main storage address for transfer on line 71 to the Auxiliary Address Register 54. As part of the address translation process, bit position 0 of the Present Address Register 51, shown as a binary "0" at 72, will be translated to a binary "1" shown at 73 in the Auxiliary Address Register 54. Thereafter, the address stored in Auxiliary Address Register 54, which is a main storage address, will be transferred on line 74 to the Pageable Address Directory 38 to initiate a normal PCS 25 access function as described in connection with FIG. 1.

The Processor Controller 20 of FIG. 1 is utilized to input information on lines 66 and 75 to provide, during the initialization process, the address in Main Storage 21 of FIG. 1 of the microinstruction to be substituted for the erroneous microinstruction. The main storage address on line 75, to be associated with the erroneous microinstruction address in Present Address Register 51, will be stored in the Address Substitute mechanism 62 to thereafter be generated on line 71 whenever the erroneous microinstruction address is utilized.

Figure 3:
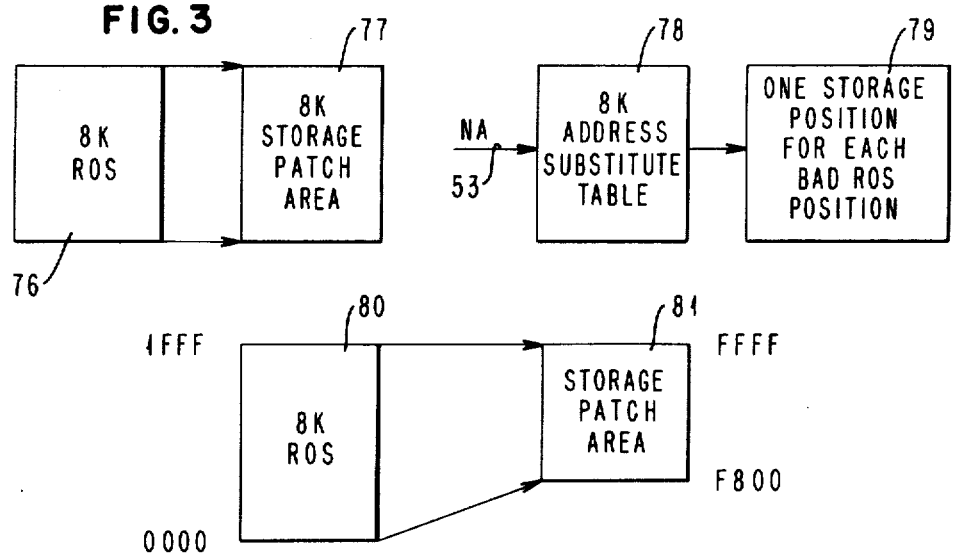
FIG. 3 is a representation of the main storage address compression achieved utilizing the address substitution mechanisms of the present invention.

FIG. 3 shows a number of alternative methods by which main storage addresses for the substitute microinstruction can be created for entry into the Address Substitute mechanism 62 of FIG. 2. One technique would require each of the 8K ROS addresses 76 to be provided with an associated main storage address 77 creating an 8K storage patch area 77. With this arrangement, the only requirement for the Address Substitute mechanism 62 of FIG. 2 is to convert the address position 72 in the Present Address Register 51 from a binary "0" to a binary "1" in the Auxiliary Address Register 54. This alternative creates a very simple Address Substitute mechanism 62, but is very wasteful of main storage address space in that 8K main storage microinstruction addresses must be permanently reserved.

Another alternative is shown in FIG. 3 where the next address (NA) bits 53 are utilized to address an 8K Address Substitute Table 78. That is, each possible 8K ROS address will have an addressable entry in the Address Substitute Table 78 only if the particular address provides access to an erroneous microinstruction. Therefore, the Address Substitute mechanism 62 of FIG. 2 would not only detect an erroneous microinstruction, but provides the ability to reserve only one main storage position for each bad ROS position as indicated at 79. Therefore, with the inclusion of a comparatively expensive Address Substitute Table 78, a great deal of compression can be realized in Main Storage 21 with very little space set aside for substitute microinstructions.

Preferred forms for the Address Substitute mechanism 62 of FIG. 2 will be described subsequently, and are represented in FIG. 3 at 80 and 81. An 8K ROS address space 80 can be compressed to a Storage Patch Area 81 which is a compromise between the amount of main storage addresses that must be reserved for substitute microinstructions, and the expense and efficiency of the address translation performed by the Address Substitute mechanism 62 of FIG. 2. As represented, the 8K ROS addresses 80 range from 0000 to 1FFF (each position representing a hexadecimal digit comprised of four binary bits), to a Storage Patch Area 81 which ranges from main storage addresses F800 through FFFF, a total of 2K microinstruction addresses. Hexadecimal notation is fairly common, but the particular representation of four binary bits representing a hexadecimal digit is shown in FIG. 5.

Figure 4:
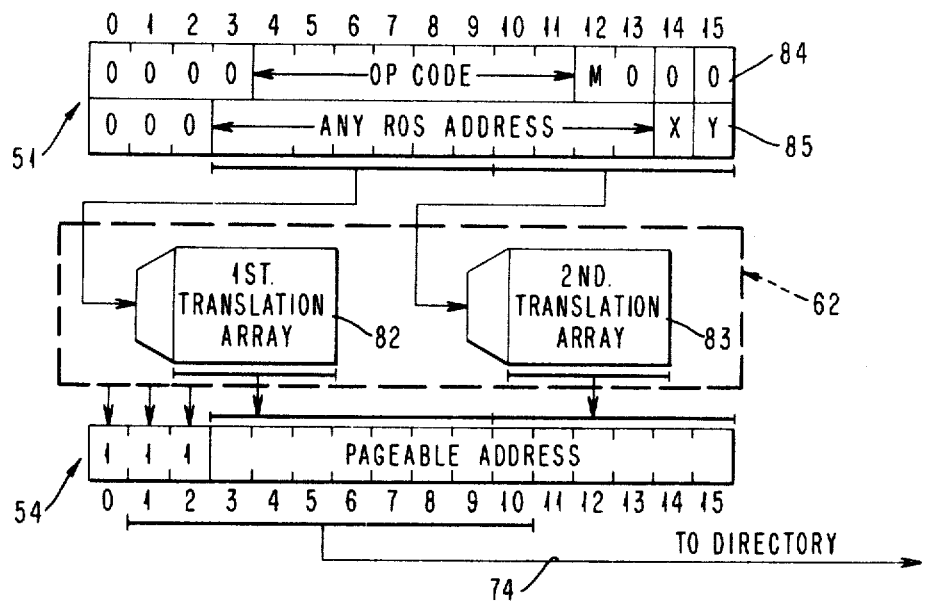
FIG. 4 is a block diagram of one implementation of an address substitution mechanism.

FIG. 4 depicts a first embodiment of the Address Substitute mechanism 62 between the Present Address Register 51 and the Auxiliary Address Register 54 shown in FIG. 2. The Address Substitute mechanism 62 is comprised of a First Translation Array 82 and a Second Translation Array 83. The format of an address to be translated may include a first cycle format shown at 84 or any other ROS address shown at 85. The address of a first cycle microinstruction includes an 8-bit OP CODE in bit positions 4 through 11. Also shown at 84 is a Mode bit in position 12 which may signify the presence of an OP CODE in a data processing system having, for example, two different instruction sets. The remainder of the bit positions shown at 84 will be a binary "0". At 85, only bit positions 3 through 15 are needed to signify a ROS address range from 0 through 8K. Bit positions 0 through 2 will be a binary "0" in all cases, and signify a ROS address. A translated address is to be inserted in the Auxiliary Address Register 54 from the First and Second Translation Arrays 82 and 83. Bit positions 0 through 2 comprise a prefix value which, in register 51, signify a ROS address and which will be altered to binary "1" to signify a main storage pageable address to be utilized in the PCS 25 access mechanism of FIG. 1.

The desirable feature of providing compression of main storage addresses is achieved by providing a First Translation Array 82 and a Second Translation Array 83. The two arrays are each addressed utilizing first and second portions of the address information in the Present Address Register 51. That is, First Translation Array 82 is addressed by bit positions 3 through 9, and the Second Translation Array 83 is addressed by bit positions 10 through 15. The addressed positions in each of the arrays 82 and 83 will have been provided with proper main storage addresses as determined by maintenance personnel and received from the Processor Controller 20. The output of the First Translation Array 82 will provide a substitute address in bit positions 3 through 9, and the Second Translation Array 83 will provide substitute address information in bit positions 10 through 15. The substitute address provided to the Auxiliary Address Register 54 will then be transferred on line 74 to access the Pageable Address Directory 38 shown in FIG. 2.

Figure 5:
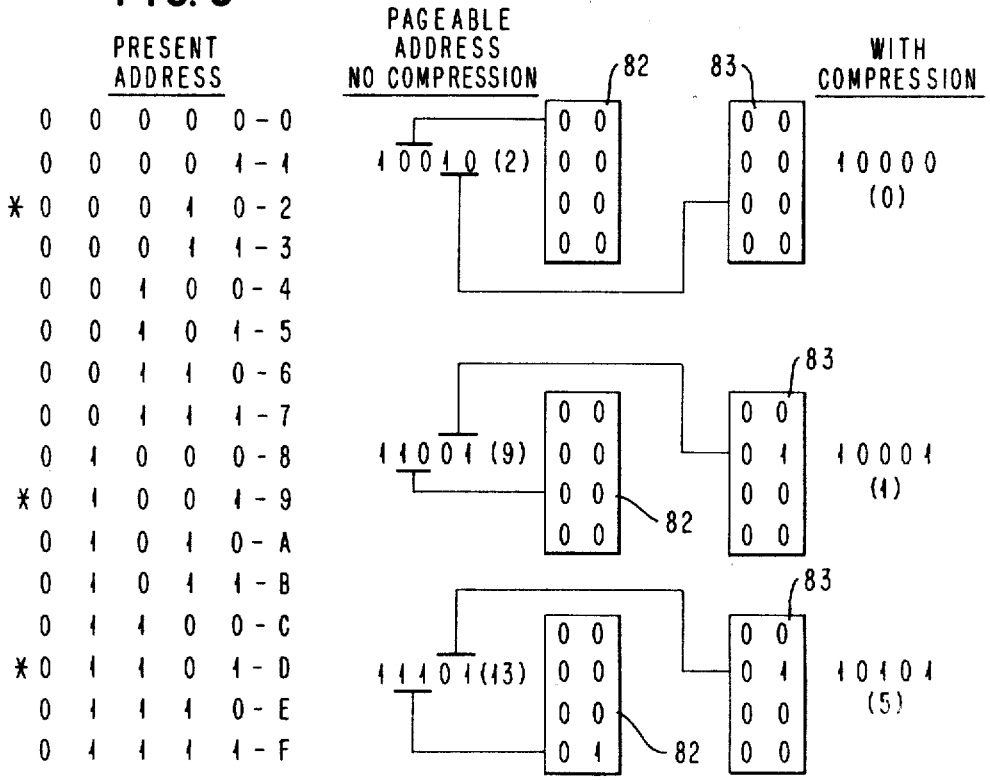
FIG. 5 is a representation explaining the theory for achieving compression of main store addresses resulting from an address substitution mechanism which includes address translation.

FIG. 5 will be utilized to explain the theory behind the information to be stored into the First Translation Array 82 and Second Translation Array 83 of FIG. 4, as determined by maintenance personnel when erroneous operation is recognized at particular ROS addresses. At the left of FIG. 5 under the heading "Present Address" is shown an example of sixteen ROS addresses ranging from 0 through F in hexadecimal notation. The designation of a ROS address is shown by the leftmost binary bit position, all of which are a binary "0". Erroneous microinstruction operation at addresses "2", "9" and "D" are indicated by an asterisk. Under the heading "Pageable Address, No Compression" the address translation technique whereby only the highest order binary bit position is changed, (from binary "0" to binary "1") shows that sixteen main storage addresses must be set aside for substitute microinstructions. At the right of FIG. 5, under the heading "With Compression", the use of a First Translation Array 82 and Second Translation Array 83 is shown to provide a compression of the number of main storage addresses that must be set aside for substitute microinstructions.

As represented in FIG. 5, the First Translation Array 82 will be addressed by the first two bits of the present address, and the Second Translation Array 83 will be addressed by the second two bits.

The error condition indicated at address number "2", causes the translation arrays 82 and 83 to be addressed as shown, and provide a translated address output of hexadecimal "0". A second erroneous address is noted at address "9". The first and second arrays 82 and 83 will be provided with translated addresses by the maintenance personnel to provide an output of hexadecimal "1".

When a third erroneous microinstruction at address "D" is recognized, the translated address information provided by the maintenance personnel must provide an output that will distinguish from the output provided when the translation arrays 82 and 83 are accessed by the erroneous address "9". The first translation array 82 is provided with the required information to create a unique translated address. This is accomplished by changing the location in the first translation array 82 addressed by the first two address bits to provide an output of "01". Thereafter, the translated address provided by the translation arrays 82 and 83 will result in a pageable address of hexadecimal "5" for the erroneous ROS address "D".

The Address Substitute mechanism 62 as implemented in accordance with FIG. 4 has achieved unique translation and compression of main storage address requirements in an efficient and inexpensive manner. This was through a recognition that only a sub-set of 8K possible addresses would require a substitute microinstruction. A substantial reduction in size and cost of the translation arrays 82 and 83 over an 8K translation table providing sixteen bit outputs is readily apparent. Each of the arrays 82 and 83 can be readily available and inexpensive 256×8 memory chips, providing sufficient translation capabilities for the number of microinstructions actually needing substitution.

Figure 6:
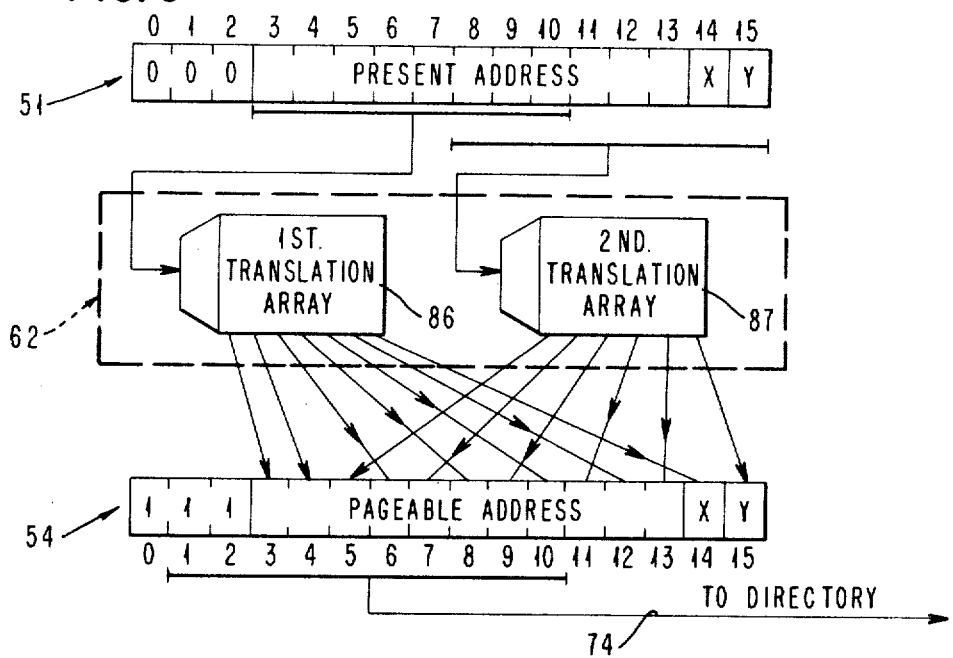
FIG. 6 is a block diagram of another form of address substitution mechanism achieving additional main store address compression.

Further compression of main storage addresses can be achieved with another embodiment of the Address Substitute mechanism 62 of FIG. 2 as shown in FIG. 6. A fairly common random access storage provides a storage module containing 256 addressable locations, which in most cases provide storage for 8 binary bits in each location. In FIG. 6, the First Translation Array 86 and Second Translation Array 87 each utilize 8 binary bits for addressing. As was the case in the embodiment shown in FIG. 4, first and second fields of the address information in the Present Address Register 51 are utilized. However, in the embodiment shown in FIG. 6, the first and second fields are caused to overlap in three bit positions. The First Translation Array 86 is addressed by a first portion comprised of the Present Address Register 51, bit positions 3 through 10, and the Second Translation Array 87 is addressed by a second portion comprised of bit positions 8 through 15. As was the case with the embodiment shown in FIG. 4, the First Translation Array 86 will provide 7 substitute address bits and the Second Translation Array 87 will provide 6 substitute address bits. However, in the embodiment shown in FIG. 6, individual bit positions from the outputs of the First Translation Array 86 and Second Translation Array 87 are transferred to the Auxiliary Address Register 54 in an interleaved manner. When the substitute address has been generated and transferred to the Auxiliary Address Register 54, bit positions 1 through 10 are transferred to the Pageable Address Directory 38 on line 74.

Figure 7:
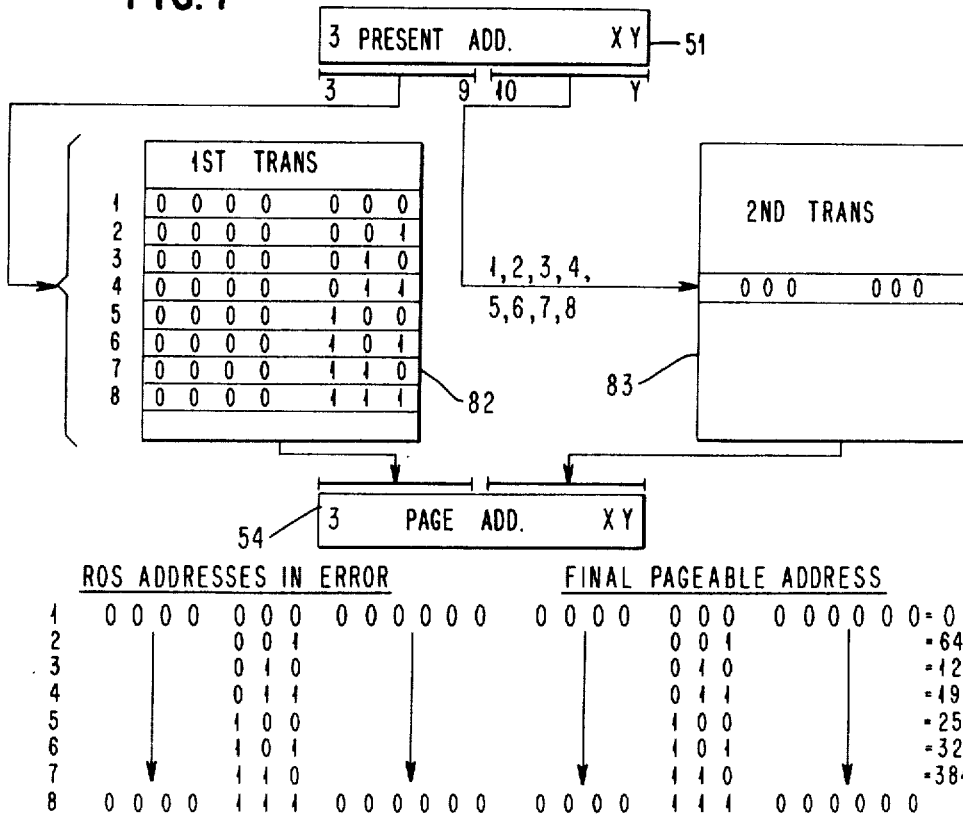
FIG. 7 is a representation of the main store address compression achieved by the apparatus of FIG. 4.
Figure 8:
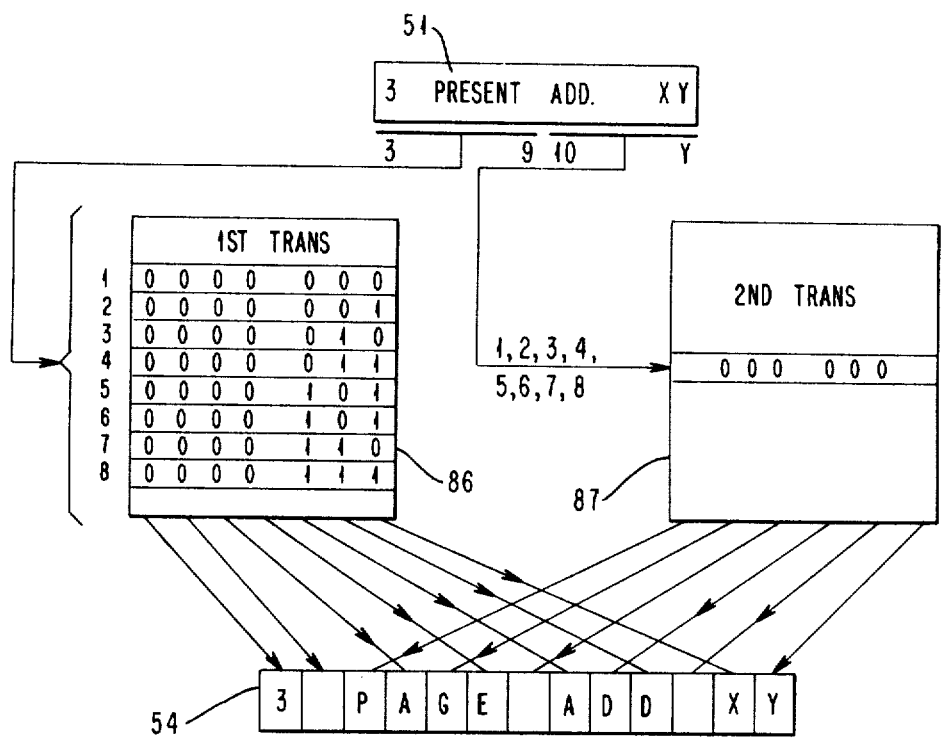
FIG. 8 is a representation of the main store address compression achieved by one implementation of the apparatus of FIG. 6.
Figure 9:
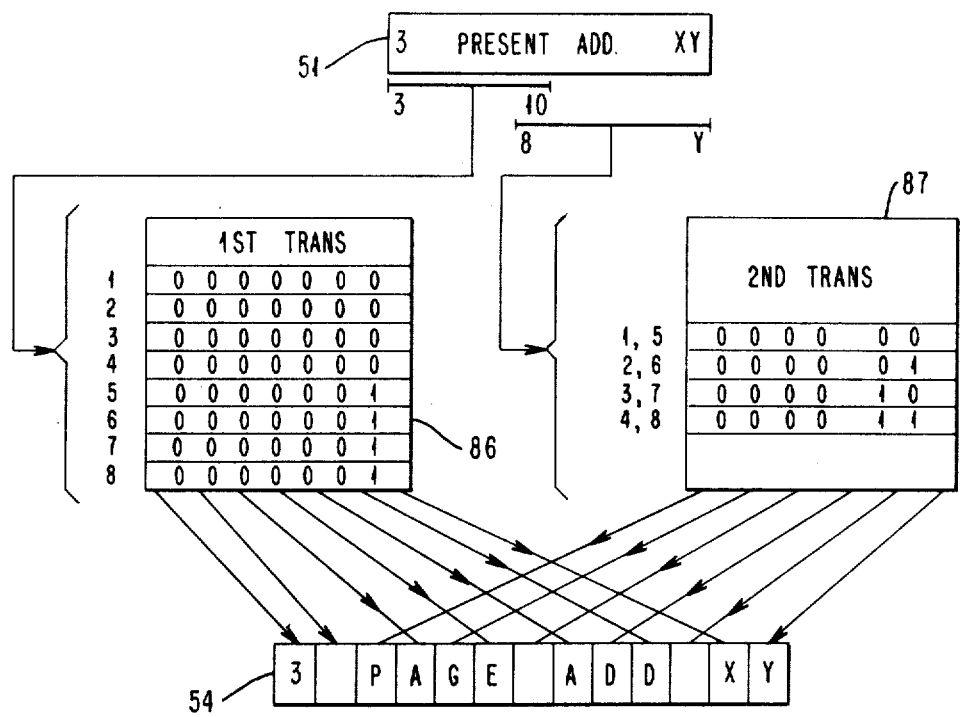
FIG. 9.is a representation of further main store address compression achieved utilizing the apparatus of FIG. 6.

FIGS. 7, 8 and 9 show the main storage address compression capabilities of the embodiments of the Address Substitute mechanism 62 shown in more detail in FIGS. 4 and 6. In these figures, eight ROS addresses are assumed to be in error requiring translation to a final pageable address for utilization in the PCS 25 accessing mechanism of FIG. 1.

In FIG. 7, the binary bit patterns of main storage addresses inserted in the First Translation Array 82 and Second Translation Array 83 of FIG. 4 are shown. As indicated previously, this information will be stored in the translation arrays from the Processor Controller 20, and will have been specified by maintenance personnel. It is seen that for the eight initial ROS addresses in error, a main storage address space ranging from "0" to "448" would be required to provide a unique address translation for each of the microinstructions in error.

FIG. 8 shows a configuration possible as a modification to FIG. 6 wherein the first and second portions of the ROS address presented to the First Translation Array 86 and Second Translation Array 87 are not overlapped, but are presented the same as shown in FIG. 4. The final pageable address compression capability that can be realized by interleaving the outputs of the translation arrays into Auxiliary Address Register 54 is shown. The interleaving of the output bits of the First Translation Array 86 and Second Translation Array 87 requires a main storage address ranging only from "0" through "42" to accommodate the eight ROS addresses in error.

If the output bit positions of the First Translation Array 86 and Second Translation Array 87 shown in FIG. 6 are interleaved as shown in FIG. 8, and the first and second portions of the Present Address Register 51 are overlapped as shown in FIG. 9, the compression of main storage addresses achieved is to only eight main storage addresses.

Figure 10:
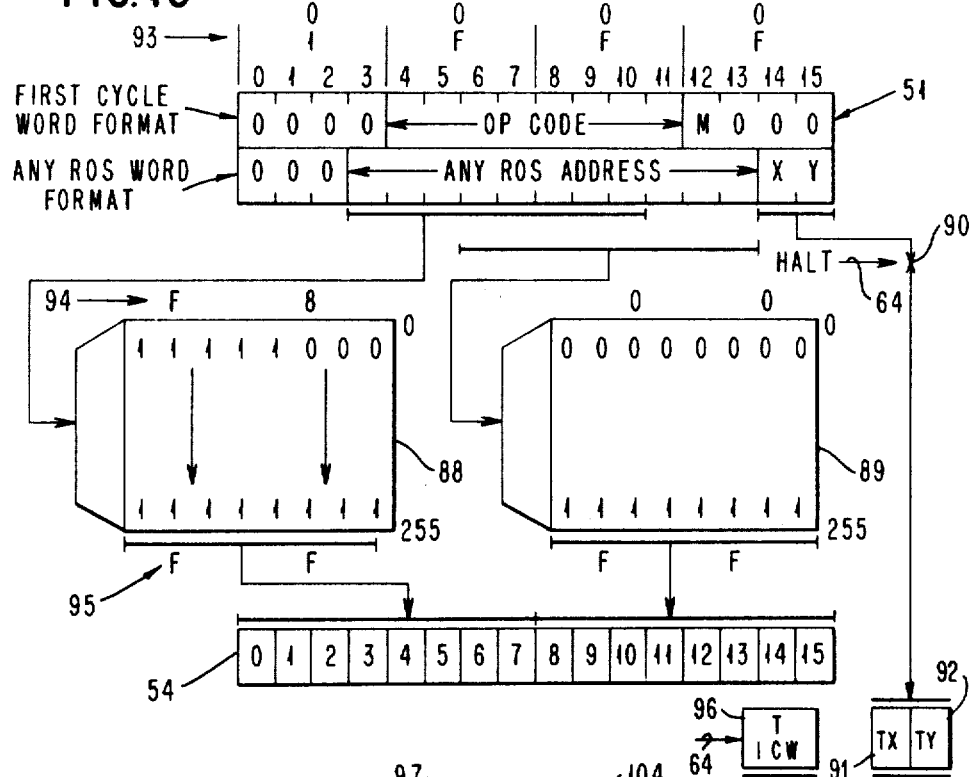
FIG. 10 is a block diagram of another address substitution mechanism providing address translation achieving further main store address compression.

The presently contemplated preferred embodiment of the Address Substitute mechanism 62 of FIG. 2 is depicted in FIG. 10. Once again, a First Translation Array 88 and Second Translation Array 89 are provided. Each of these arrays are comprised of 256 locations, each providing an 8-bit output. The arrays 88 and 89 are addressed with 8 bits of the Present Address Register 51 which are provided in an overlapped fashion. That is, address bit positions 3-10 are utilized for addressing First Translation Array 88, and address bit positions 6 through 13 are utilized to address the Second Translation Array 89. The embodiment shown in FIG. 10 differs from those previously discussed in that a third portion of the address in the Present Address Register 51, namely the low-order XY branch selection bits are gated by the Halt signal 64, effective at gate 90, to corresponding triggers 91 and 92 for subsequent use.

In the embodiment of FIG. 10, only 2K microinstruction addresses in main storage are set aside for providing a substitute microinstruction for any of the 8K ROS microinstructions and the 256 possible first cycle microinstructions.

The embodiment of the Address Substitute mechanism 62 of FIG. 2, shown in FIG. 10, differs from those shown in FIG. 4 and FIG. 6 in that the binary bit patterns in the First Translation Array 88 and Second Translation Array 89 can be made permanent and require no modification as erroneous microinstructions are subsequently detected. As shown, the range of ROS addresses, including addresses created during a first cycle, will range from a hexadecimal 0000 through 1FFF, as depicted at 93 totaling 8K. The 2K main storage addresses set aside in the reserved area 44 of FIG. 1 are caused to have an address range from F800 shown at 94 to FFFF as shown at 95. These values can be inserted permanently in First Translation Array 88 and Second Translation Array 89, or flexibility can be given to maintenance personnel by allowing them to most efficiently create main storage addresses within these ranges as required. By providing permanent assignments, the maintenance personnel utilizing the Processor Controller 20 of FIG. 1 will only be required to provide the necessary information to update the First Cycle Halt Array 60, or ROS Halt Array 61 of FIG. 2, and create the necessary microinstructions for storage in their proper location in the reserved area 44 of FIG. 1.

The 2K main storage microinstruction addresses reserved for translated addresses, creates what is known as a "synonym" problem. That is, the substitute address created in the Auxiliary Address Register 54, to be utilized in the PCS 25 access method of FIG. 1, is associated with four possible ROS microinstructions and one possible first cycle microinstruction (1CW). The XY branch bits identify a particular microinstruction in a branch group, and are used for addressing the ROS Halt Array 61 of FIG. 2. If more than one microinstruction in a particular branch group is in error, the address bits 3 through 13 utilized for addressing the First and Second Translation Arrays 88 and 89 will not provide a translated address which identifies the particular microinstruction requiring a substitute microinstruction.

The translated address inserted in the Auxiliary Address Register 54 will provide access to a microinstruction provided by the maintenance personnel which will be coded as a first type or second type. If only one microinstruction of a branch group is known to be in error, the translated address will access a substitute microinstruction of a first type that can be immediately executed in place of the faulty microinstruction. If a second microinstruction of a branch group is determined to be in error, then maintenance personnel must provide access to a microinstruction of a second type that has properly coded XY branch control fields to provide access to a substitute microinstruction associated with each of the faulty microinstructions in the branch group. In other words, the microinstruction accessed by the translated address through the PCS 25 access mechanism will include, as shown in FIG. 1, an X branch code field 27 and a Y branch control field 28, which will be coded to sample the binary state of the triggers 91 and 92.

Figure 11:
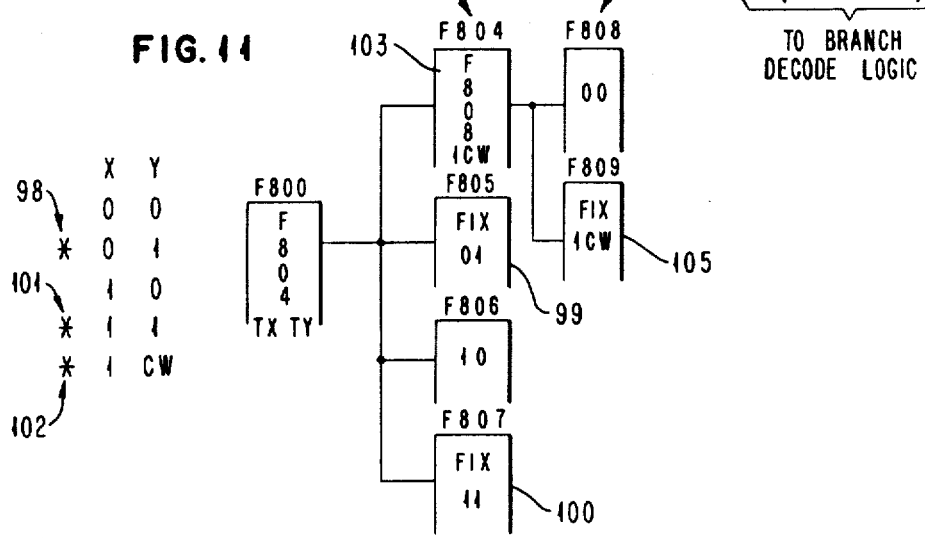
FIG. 11 is a representation of a microinstruction sequence utilized in the address substitution mechanism of FIG. 10.

This concept is depicted in FIG. 11. The XY branch bit combinations are shown at the left in FIG. 11 along with a first cycle word (1CW) indication. In FIG. 10, when the First Cycle Halt Array 60 of FIG. 2 produces a Halt signal 64 during a first cycle, a trigger 96 will be set which can be subsequently sampled by a microinstruction branch decode control field.

As shown in FIG. 11, two different microinstructions from a particular microinstruction branch group from ROS 24 of FIG. 1 have been indicated as being in error by an output on line 64 of the ROS Halt Array 61 of FIG. 2. The branch group identified by address bits 3 through 13 in the Present Address Register 51 are shown to provide an output from the First and Second Translation Arrays 88 and 89 providing a translated address F800 utilized for addressing Main Storage 21 of FIG. 1. The microinstruction located at address F800 will be of the second type, and have an X branch decode field 27 and a Y decode branch field 28 specifying triggers 91 and 92 respectively for testing. The microinstruction located at F800 specifies a next address field F804 which will cause access from PCS 25 of a branch group of microinstructions depicted at 97. The particular one of the microinstructions in the branch group at 97 will be read out to the CSDR 22 based on the binary state of the X trigger 91 and Y trigger 92 of FIG. 10. For example, if the Halt signal was generated by a microinstruction accessed by XY branch bits shown at 98, the sampling of the X trigger 91 and Y trigger 92 by the microinstruction at location F800 will provide readout into the CSDR 22 of FIG. 1 of the microinstruction indicated at 99. This is a microinstruction of the first type, and will be the substitute microinstruction providing the "fix" for the erroneous microinstruction. In a like manner, the microinstruction shown at 100 in the branch group 97 would be transferred to the CSDR 22 as the substitute microinstruction for the one indicated as being in error at 101.

If it has been determined that a first cycle word (1CW) is in error, shown at 102, the microprogrammer providing the fix for this error condition would have inserted microinstructions into the reserved area 44 of Main Store 21 in FIG. 1 in which the microinstruction at 103 would be coded as a microinstruction of a third type with a next address field that accesses a branch group of microinstructions depicted at 104. This is required to resolve the possibility that the microinstruction in error is from a ROS 24 branch group with XY branch bits of "00", and therefore one branch decode field must sample the 1CW trigger 96. The microinstruction at location F804 would have an X branch decode field 27 or Y branch decode field 28 which samples the first cycle trigger 96 to provide selection of the microinstruction of a first type noted at 105. The microinstruction shown at 105 would be the microinstruction to be substituted for the erroneous microinstruction encountered during that particular first cycle.

In the showing of FIG. 11, the translated address F800 generated from the First Translation Array 88 and Second Translation Array 89, when presented to the Pageable Address Directory 38 of FIG. 1, would probably create a miss situation requiring access to the reserved area 44 of Main Storage 21. Access to Main Storage 21 returns on line 45 to PCS 25, a line of 32 microinstructions. Therefore, once access has been made for these 32 microinstructions, as shown in FIG. 11, all of the remaining microinstructions that might be accessed as a result of accessing microinstructions at F800 will find a hit in the Pageable Address Directory 38 of FIG. 1, providing immediate access to any of the subsequent microinstructions shown in FIG. 11. Even though a synonym problem has been created by the apparatus shown in FIG. 10, one or more microinstructions accessed by the translated address will resolve the synonym situation to identify the proper substitute microinstruction to be utilized.

While the invention has been particularly shown and described with references to a plural embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. Apparatus for providing a sequence of microinstructions on successive cycles for control of a data processing system in response to machine instructions including at least an operation code field comprising:

microinstruction storage means having a plurality of addressable microinstructions;

a control register connected to said microinstruction storage means for receiving, on successive cycles, a microinstruction for control of the data processing system;

addressing means connected to said microinstruction storage means for transferring a sequence of address manifestations to said microinstruction storage means for accessing microinstructions from said microinstruction storage means for transfer to said control register for execution; halt signalling means connected to said addressing means for generating a halt signal in response to predetermined ones of said sequence of address manifestations;

means connecting said halt signal to said control register for inhibiting control of the data processing system by microinstructions accessd by said predetermined ones of said sequence of address manifestations; and address substitution means connected to said halt signalling means and said addressing means for transferring a substitute address manifestation to said addressing means in response to said halt signal for accessing said microinstruction storage means to read out a substitute microinstruction to said control register for execution.

2. Apparatus in accordance with claim 1 wherein:
said microinstruction storage means includes a read only portion and a changeable portion;

said addressing means means for transferring a sequence of address manifestations of a first or second type for accessing said read only portion or said changeable portion respectively; and said address substitution means means for transferring a substitute address of said second type to thereby access said substitute microinstruction from said changeable portion.

3. Apparatus in accordance with claim 2 wherein:

said changeable portion is comprised of a writeable control store, a plurality of addressable locations of a main storage each storing microinstructions, and a transfer path from said plurality of addressable locations of a main storage to said writeable control store;

said writeable control store having a plurality of addressable locations connected to said addressing means for read-out to said control register of an accessed microinstruction, each microinstruction stored in said control register including a next address field for manifesting a next microinstruction address;

said address substitution means includes means for transferring to said addressing means a substitute address manifestation identifying one of said plurality of addressable location of said main storage storing a substitute microinstruction; and said addressing means includes address directory means including means storing, for each of said plurality of addressable locations in said writeable control store, the address manifestation identifying the one of said plurality of addressable locations of said main storage from which microinstructions were transferred on said transfer path to said writeable control store, said address directory being responsive to said address manifestation identifying one of said plurality of addressable locations of said main storage from said address substitution means for generating a match or no-match signal indicating the presence or absence of the addressed microinstruction in said writeable control store, said match signal being operative to transfer the addressed microinstruction from said writeable control store to said control register, and said no-match signal operative to address said main storage with said address manifestation identifying one of said plurality of addressable locations of said main storage for transfer of the next microinstruction from said main storage to said writeable control store.

4. Apparatus in accordance with claim 3 wherein:

said microinstruction storage means further includes a first cycle control store;

said addressing means includes means for transferring an address manifestation including the operation code field of a data processing machine instruction for accessing said first cycle control store during a first of successive cycles of execution of the data processing machine instruction, and means for addressing said read only portion on at least a second subsequent cycle; and said halt signalling means includes a first cycle addressable array responsive to the operation code field of an address manifestation from said addressing means, and a read only portion addressable array responsive to said next address field in said control register addressing a microinstruction in said read only portion, said first cycle addressable array and said read only portion addressable array each comprised of an array of single-bit storage positions, each single-bit storage position being addressable by a particular address manifestation from said addressing means.

* * * * *